US008127221B2

(12) United States Patent
Vaschillo et al.

(10) Patent No.: US 8,127,221 B2
(45) Date of Patent: Feb. 28, 2012

(54) OPTIMAL SIZES OF OBJECTS IN A DOCUMENT

(75) Inventors: Alexander Vaschillo, Redmond, WA (US); Sergey Genkin, Redmond, WA (US); Victor Kozyrev, Issaquah, WA (US); Andrei Burago, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1035 days.

(21) Appl. No.: 12/039,738

(22) Filed: Feb. 29, 2008

(65) Prior Publication Data

US 2009/0222722 A1 Sep. 3, 2009

(51) Int. Cl.
*G06F 17/00* (2006.01)

(52) U.S. Cl. ........ 715/209; 715/243; 715/244; 715/245; 715/249

(58) Field of Classification Search .................. 715/209, 715/243–245, 249
See application file for complete search history.

(56) References Cited

U.S. PATENT DOCUMENTS

| 4,899,061 | A | 2/1990 | Van Hoek et al. |
| 6,088,708 | A | 7/2000 | Burch et al. |
| 6,243,721 | B1 * | 6/2001 | Duane et al. ................. 715/234 |
| 6,414,698 | B1 * | 7/2002 | Lovell et al. ................. 715/800 |
| 6,559,971 | B1 * | 5/2003 | Watts et al. ................... 358/1.2 |
| 6,919,890 | B2 | 7/2005 | Halstead |
| 6,928,610 | B2 * | 8/2005 | Brintzenhofe et al. ....... 715/202 |
| 7,127,673 | B2 * | 10/2006 | Iwata et al. ................... 715/209 |
| 7,178,891 | B2 * | 2/2007 | Takamiya ......................... 347/5 |
| 7,212,309 | B1 * | 5/2007 | Sellers et al. .................. 358/1.2 |
| 7,362,311 | B2 * | 4/2008 | Filner et al. .................... 345/169 |
| 7,743,322 | B2 * | 6/2010 | Atkins ........................... 715/243 |
| 2003/0226113 | A1 * | 12/2003 | Altman et al. ................ 715/520 |
| 2005/0094206 | A1 | 5/2005 | Tonisson |
| 2006/0085739 | A1 | 4/2006 | Iwasaki |
| 2007/0124669 | A1 * | 5/2007 | Makela ......................... 715/520 |
| 2007/0136665 | A1 | 6/2007 | Stuple et al. |
| 2007/0201053 | A1 * | 8/2007 | Sellers et al. .................. 358/1.2 |
| 2007/0208996 | A1 * | 9/2007 | Berkner et al. ............... 715/521 |
| 2009/0002764 | A1 * | 1/2009 | Atkins et al. ................. 358/1.18 |

OTHER PUBLICATIONS

Baron, "Layout Algorithm Improvements for Web User Interfaces", IDEAlliance Inc. 2001-2007.
"Whidbey Layout", retrieved at <<http://www.windowsclient.net/Samples/Go%20To%20Market/Layout/layoutGTM.doc>>.
Barbalace, "TableLayout Tutorial, Part 1", Jan. 24, 2002.
"Tables", retrieved at <<http://www.w3.org/TR/CSS21/tables.html>>.

* cited by examiner

*Primary Examiner* — Chau Nguyen

(57) ABSTRACT

Architecture of one or more algorithms for autofitting objects with non-trivial geometries in documents. The algorithms autofit rectangular objects (such as floaters), when the objects contain both left and right aligned objects, autofit tables, determine correct sizes of a parent object and its child object when the width of the parent object is unknown (referred to as an auto-width), and the width of the parent's child object is expressed in percentages of the parent object width. A two-pass algorithm determines the best (or optimal) sizes of margins, borders, and paddings of objects where any combination thereof can have fixed width, auto width, and/or percentage-expressed width. Additionally, the algorithms can recursively calculate the optimal widths of objects inside other objects, where the outer object width is undefined. The algorithms can process an unlimited number of nesting levels.

20 Claims, 9 Drawing Sheets

OPTIMAL SIZES OF OBJECTS IN A DOCUMENT

BACKGROUND

Documents that include objects such as text, pictures, tables, etc., are becoming more common as a tool for effectively communicating intents and goals. It is oftentimes the case, however, that when a document contains these objects the width of such objects is not predefined in the document properties. An application formatting the document for the purposes of displaying or printing then needs to determine an optimal size (width) of the objects based on the content of such object. The content of an object may be complex and determining the ideal size becomes a non-trivial task. For example, if the object contains some left-aligned text or floater objects and also some right-aligned text or floater objects an algorithm is then employed to layout these objects properly to determine how do the objects fit on the page relative to each other. This problem is commonly known as autofitting objects, or as a "shrink-to-fit" algorithm.

Different applications attempt to solve this problem in different ways. For example, a word processor may use a proprietary algorithm for floaters and tables, while browsers also attempt to solve this problem in yet another way. One emerging standard Cascading Style Sheets (CSS)—a W3C standard for Web (HTML) layout, recognizes this problem as complex, describes some basic requirements for autofitting objects, but leaves the exact algorithm to the developers of applications. Furthermore, there are complex (non-trivial) cases (such as a block width being a percentage of a parent block width and the parent block width is unknown) where CSS does not define requirements to the layout. In such cases the standard indicates that the layout is undefined and gives developers the freedom of coming up with some reasonable layout.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture describes one or more algorithms for autofitting objects with non-trivial geometries in documents. The algorithms autofit rectangular objects (such as floaters), when the objects contain both left and right aligned objects, autofit tables, determine correct sizes of a parent object and its child object when the width of the parent object is unknown (referred to as an auto-width), and the width of the parent's child object is expressed in percentages of the parent object width. A two-pass algorithm determines the best (or optimal) sizes of margins, borders, and paddings of objects where any combination thereof can have fixed width, auto width, and/or percentage-expressed width. Additionally, the algorithms can recursively calculate the optimal widths of objects inside other objects, where the outer object width is undefined. The algorithms can process an unlimited number of nesting levels.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
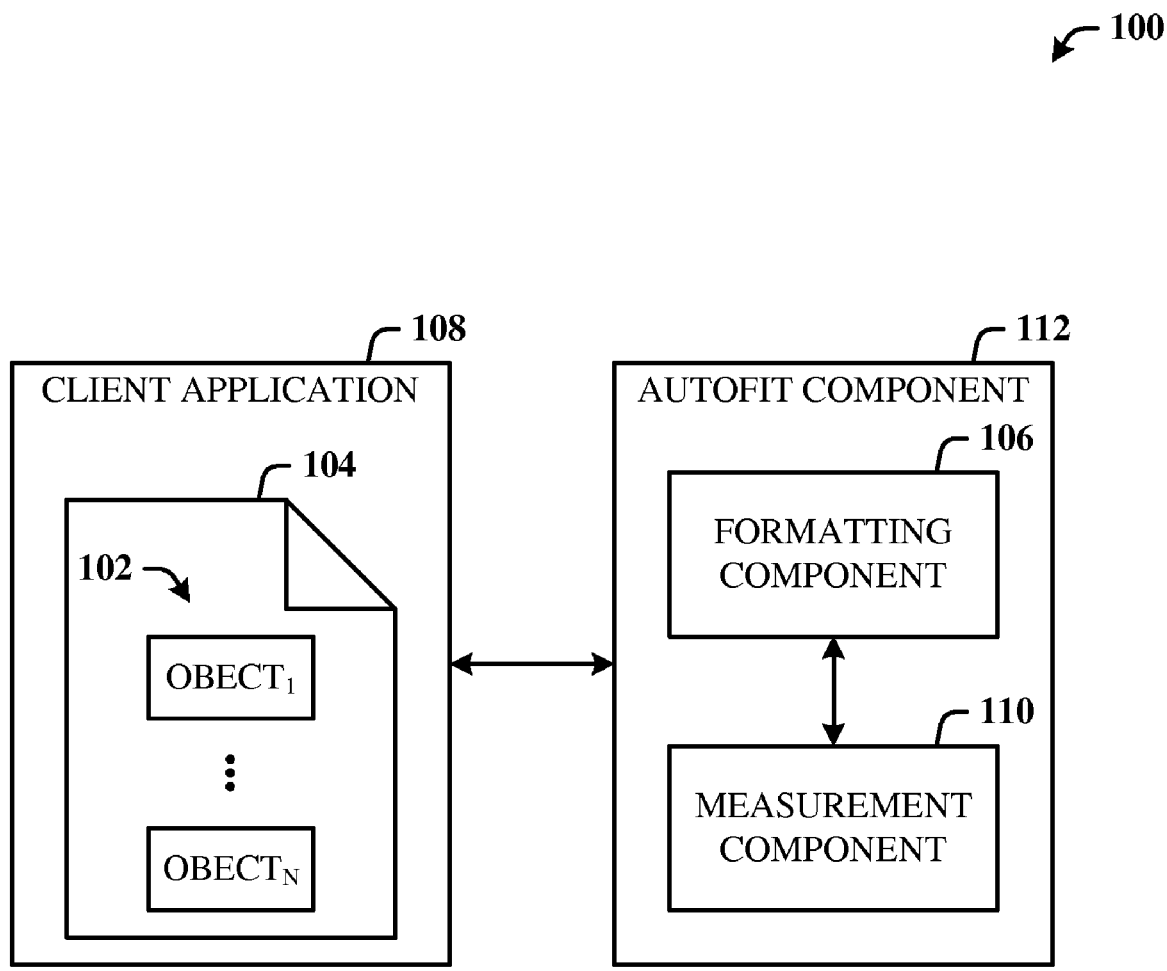
FIG. 1 illustrates a computer-implemented system for processing objects in a document.

The disclosed architecture includes one or more algorithms for formatting a document having one or more objects that include trivial and non-trivial content. The object content can be trivial content such as simple text or non-trivial (more complex) content such as combinations of text and images or graphics, floater objects, tables, and so on. These complex geometries introduce particularly difficult formatting and measurement requirements heretofore not solved by conventional mechanisms. Moreover, both left and right-aligned objects supplant the difficulties unresolved in conventional mechanisms.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives falling within the spirit and scope of the claimed subject matter.

FIG. 1 illustrates a computer-implemented system 100 for processing objects 102 in a document 104. The system 100 includes formatting component 106 for formatting the objects 102 (denoted $OBJECT_1, \ldots, OBJECT_N$) of the document 104 of a client application 108 based on content (e.g., text, image, etc.) in the objects 102. A measurement component 110 automatically computes optimal sizes of the objects 102 based on results of the formatting. This includes unoccupied space (e.g., horizontal, vertical) between the objects 102. The formatting of the objects can occur in unoccupied space along an "infinite" horizontal width. "Infinite" as used herein is intended to mean a sufficiently wide horizontal distance or width such that left-aligned objects do not intersect or overlap horizontally with right-aligned objects. This will also be referred to herein as a "non-intersecting horizontal width". The formatting component 106 and the measurement component 110 can be embodied as an autofit component 112 for install on a client system to handle all object processing for client applications (e.g., client application 108).

The objects can include left-aligned rectangular and non-rectangular objects and right-aligned rectangular and non-rectangular objects and floater objects (floaters). In other words, the rectangular objects can include a floater that presents a complex geometry (non-rectangular) when computing an optimal size of the object. The complex geometry in this case can be defined by an overall object that includes text (a rectangular object) and an image or graphical icon (the floater object). Moreover, the combined boundaries of the text and floater results in a non-rectangular (complex) geometry that needs to be processed for optimal object size and placement in the document 104.

The measurement component 110 can also compute the optimal size of a parent object and the optimal size of a child object of the parent object when a width of the parent object is unknown. The width of the child object can be expressed as a percentage of the width of the parent object. The measurement component 110 can also compute the optimal sizes of margins, borders, and paddings of the objects. In other words, the content of an object is within an area referred to as padding, the padding is within an area referred to as a border, and the border is within an area referred to as a margin. The content, padding, border, and margin areas can be defined as geometric shapes (e.g., rectangles) having horizontal and vertical sides, for example. The areas can also be defined according to pixels relative to a horizontal dimension (width) and a vertical dimension (height).

The objects 102 in the document 104 can include at least one of fixed-width objects, automatic-width (auto) objects, or percentage-expressed width objects. In other words, the objects can include any combination of the objects (e.g., zero or more of fixed-width, auto-width, and percentage-width objects). The objects can also include tables for which the measurement component 110 computes the optimal size. The measurement component 110 can recursively compute the optimal width of an inner object inside of an outer object where the width of the outer object is undefined. Additionally, the level of nesting of the objects within other objects is unlimited.

Figure 2:
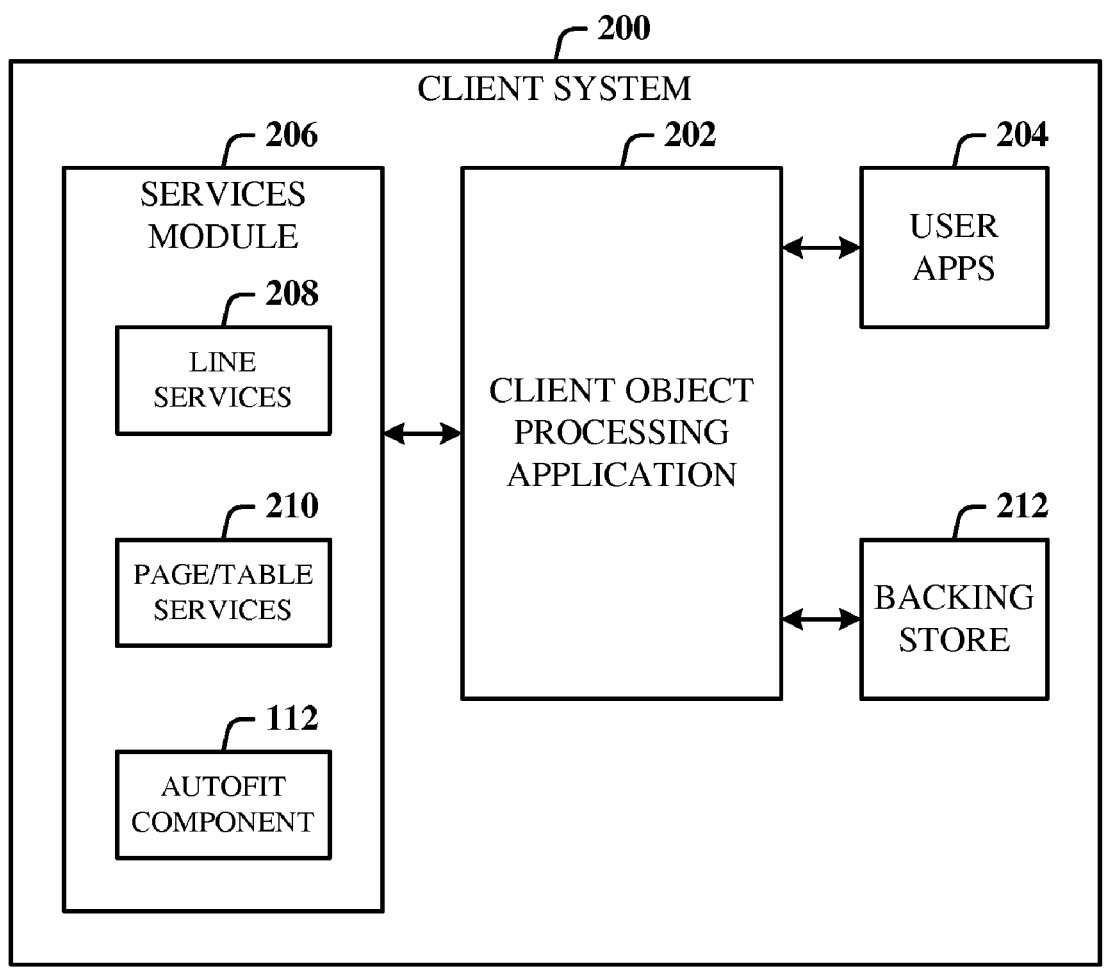
FIG. 2 illustrates a client system for autofitting document objects.

FIG. 2 illustrates a client system 200 for autofitting document objects. The client system 200 includes a client object processing application 202 that facilitates the autofitting process for documents of one or more user applications 204 (e.g., word processor, presentation, browser, etc.) that create or process documents with objects. The client application 202 interfaces to a services module 206 that provides support for line services 208 and page/table services 210 and autofitting services via the autofitting component 112. The client object processing application 202 initiates the autofitting process and provides input data from a backing store 212 to the services module 206 for autofitting. The backing store 212 is a file that stores properties associated with objects such as object width, page breaks relative to an object (e.g., before, after, inside), and an ordered set of the objects as being analyzed and formatted.

The types of objects can include pel, trel and text. A pel object is a block layout element that establishes a formatting context. The pel element is rectangular, does not allow outside elements into its rectangle, and generally, does not allow its own content to exceed the bounds of the rectangle (with some exceptions such as overflow:visible apply). The trel object is an element that does not have to be rectangular. The trel lives in the parent geometry and may flow around other objects in the parent. Text is an object representing text.

Paragraphs in the document are reported to the services module 206 as belonging to one of the pel, trel or text. However, pel has subtypes. The Pel content can be one of the following kinds: subpage—a sequence of paragraphs in a separate block formatting context; table—simply a table; math—mathematical paragraph; and user—any user-defined content (e.g., image).

All user application objects (e.g., HTML) are properly mapped into the services objects (pel, trel and text). Basically, tables, images and BFC (block formatting context) blocks are reported as pels, other blocks (not BFC) are reported as trels. Each HTML block tag creates a Trel or a Pel. Anonymous text paragraphs are reported as text. Multiple chunks of text on the same level separated by out-of-flow objects are reported as one text object. A block containing a text paragraph is reported as a trel (or pel) object with a text object inside. Out-of-flow objects (floats, APEs (absolutely positioned elements), IBEs (inline block elements)) are reported as pels attached to surrounding text. An APE can be formatted out of the main flow as it does not collide with text or other objects in the main flow. An IBE is part of a line and so is processed by the line services 208; however, what is inside the IBE look and behaves like a page/table object. Thus, IBEs can be processed by both the line services 208 and the page/table services 210.

If there is no surrounding text, an empty text object can be created and reported to the services module 206. If there are several out-of-flow objects on the same level not separated by in-flow pel or trel objects the out-of-flow objects are reported as attached to the same text object. HTML tags that do not create blocks: such as <b>, <i>, etc., do not create anything reportable to the page table services 210 (the tags are only reported to line services 208). The tag can be treated as a text character; but in cases when there is no text paragraph yet, an anonymous text paragraph can be created.

The Cascading Style Sheets (CSS) standard, a W3C standard for web layout does not address ways in which to handle complex geometries where tables, floaters, and APEs, for example, are involved. The services module 206 implements the autofitting algorithms leaving the client object processing application 202 with supporting the autofit component 112 with input data.

For example, in order to format an object the services module 206 needs to know the object width. While in some simple cases the width of an object can be trivially calculated from the properties (e.g., fixed width or full width of parent track) in the backing store 212, more complex cases use autofitting, which can require formatting the entire content of the object, possibly several times.

Thus, in the services module 206, this process is split into two steps. First, a size client callback (referred to as pfnGetPelSizeClient callback) is called giving the client application 202 an opportunity to run one or more autofit algorithms and calculate the desired widths, such as width of content, width of margins, borders and padding, and width of all columns for a table. All calculated widths are stored (in a way that is opaque to the services module 206) in the pfsSizeClient data structure, which is returned from the pfnGetPelSizeClient callback. Second, the services module 206 calls a pfnGetPelSizes callback passing the pfsSizeClient data structure as input and asking the client application 202 to extract the desired widths and return the widths to the services module 206.

An advantage of this approach is that if the object breaks between pages, the pfsSizeClient data structure is passed through the break record to the second page, thus eliminating the need to redo autofit on the second page. Note that the services module 206 calls pfnRefreshPelSizeClientAfterBreak callback on the second page just in case the client application 202 wants to refresh the pfsSizeClient. A use for this is to decrease the height of a fixed-size object by the dvr of content already placed on the first page (this dvr is given as input). Another advantage is that pfsSizeClient is the place where the client application 202 can store widths of all columns in the table and thus pass the widths to the second page after break. The same pfsSizeClient data structure can also be passed to the cell formatting callbacks so that client application 202 can use the pre-calculated column widths.

Autofitting a table is a complex task. The services module 206 assist the client application 202 in performing the autofitting by providing a service (fsGetMinMaxWidthSubpage) that returns minimum and maximum width of a subpage. Since each cell is a pel object which most probably has subpage as its content, the client application 202 uses this service to find the minimum and maximum width of each cell. The client application 202 processes this information, calculates proper widths of table columns, takes into account merged cells, and finally, calculates the autofitted width of the table.

Autofitting is performed by the client application 202 using services of the services module 206 when the services module 206 calls the client application 202 to create the pfsSizeClient data structure for the table pel object. The services module 206 later calls pfnGetPelSizes and expects to receive the following data out of pfsSizeClient which is the result of the autofitting process: durWidth, durWidthMin, and durWidthMax. durWidthMin and durWidthMax are returned only if requested by an fMinMaxRequired input bit.

durWidth is the resulting width of the autofit of the table. This is how the table looks on the screen for a given durAvailable (available width). In addition, the minimum and maximum widths can be returned, because these widths may be used for determining min/max width of a block containing this table, for example, for the case of a nested table.

Note that while in most cases durWidth will be a value in the range between durWidthMin and durWidthMax, this is not always true. For example, if the table in CSS indicates that durWidth is to be 100% of its parent, durWidth may become bigger than durWidthMax.

durWidthMax is vaguely defined as the width of a table, where the table uses as much horizontal space as desired (where no lines break, no floaters are moved to the next line, etc.). However, if CSS indicates the table is of a certain percentage of the parent, and this percentage of the parent width is bigger than durWidthMax, the client application 202 will have to stretch the table to this bigger size. durWidthMax will be reported unstretched and durWidth will exceed durWidthMax.

This also applies to "auto" margins. If margins are set to auto, this means the margins want to take all available space left by the maximum width of the object. durWidthMax does not include these margins since the object is still "happy" if there is no space left for the margins. Note that when both durWidthMin and durWidthMax are reported to the services module 206, both contain margins, and margin values for durWidthMin and durWidthMax may be calculated differently (if margins are set as percentages).

In the following description, the discussion about margins also applies to padding, since padding can also be set as a percentage of the parent.

When a table is to autofitted, the client application 202 first determines the min and max width of each cell. If cell is fixed width, this is the min and max width. If the cell is subpage, fsGetMinMaxWidthSubpage is employed to obtain the min and max widths of the content of each cell, and account for the margins, borders, padding of the cell. If the cell is a nested table, the same algorithm is employed as for the table, but then recursively. If the cell is a pel user, the width is most probably fixed (as in the case of an image), or else it is up to the client application 202 to determine the min/max widths or possibly also using the fsGetMinMaxSubpage service. Based on the min/max widths of all cells, the autofit width of the table is calculated.

By calling fsGetMinMaxWidthSubpage, the client application 202 initiates an fMinMaxRequired formatting pass. The services module 206 formats the subpage in infinite width and collects all information for determining the min and max widths. This is a pass where the client application 202 reports some of the widths of objects inside the autofitted subpage differently.

A problem can be that during this pass the available width is unknown (infinite), so all widths that depend on the available width (set in the backing store 212 as percentages of parent width) are reported as described following. (1) If the margins or content are a fixed size, all are reported as a fixed size. (2) If the content is to be autofitted, the content is autofitted based on the available width (in most cases infinite). This may performed if a table cell contains an autofit floater or nested table. (3) If the margin is auto, it is reported as zero. This is desired, since otherwise, this margin will return an infinite width.

(4) If the content of a pel is a percentage of the parent, the margins are designated as zero, the content is autofitted in available width (infinite) by using the fsGetMinMaxWidthSubpage algorithm recursively, if desired. Then the margins are added. This autofit process is performed in the pfnGetPelSizeClient callback and resulting values are reported in the pfnGetPelSizes callback. (5) If the margins are percentages of a parent, the sizes of margins are calculated based on the size of the content rather than the size of the parent (divide the content size by the percentage instead of multiplying parent's size by this percentage).

(6) If both the content and the margins of a pel are a percentage of the parent, autofit the content and then calculate the margins (both in the manner described in (4) and (5)) based on the autofitted content width.

If the margin of a trel is a percentage of the parent, the trel content is autofitted as if this content was a subpage, and the same algorithm ((4), (5) and (6)) as for the pel is followed. This process happens in the pfnGetTrelSizes callback.

The client application 202 knows when the system is in the fMinMaxRequired pass and the widths are to be reported from the services module 206. The services module 206 tells the client that pfnGetPelSizeClient and pfnGetPelSizes callbacks get the fMinMaxRequired bit on input to be able to know when in an autofit pass, and pfnGetTrelSizes callback gets an input bit fMinMax that can be used for the same purpose.

The CSS standard does not require agents to support percentages inside autofit. Thus, if a margin or content is set as a percentage of a parent, and the parent's width is autofitted, CSS indicates the result is undefined.

Autofitting of a floater object is performed with the same service, fsGetMinMaxWidthSubpage. The same rules for reporting widths inside the floater content apply as described above for tables. If a floating pel is be autofitted, the client application 202 autofits the pel in the pfnGetPelSizeClient callback. To accomplish this, the client application 202 determines the minimum and maximum width of pel content using the fsGetMinMaxWidthSubpage service, and calculates the final width of the content based on the min, max, and the width available for the content.

The width available for the floater content can be calculated as follows. If the fMinMaxRequired bit given on input to pfnGetPelSizeClient for the pel is false, durAvailable given on input is a valid number. The client application 202 calculates the width available for the content by deducting margins, borders, and padding for the floating pel from durAvailable. If the fMinMaxRequired bit given on input to pfnGetPelSizeClient for the pel is true, durAvailable given on input is infinite. The width available for the content is infinite, so the width of the floater content is equal to the max value returned by the fsGetMinMaxWidthSubpage service. The margins are calculated based on the content width as described in the algorithm for table (percentages based on content, auto taken as zero).

Following is a more detailed description of autofitting algorithms and the services provided by the services module 206 for the different kinds of objects. Autofitting floaters and most other objects is a similar task. Autofitting a table is a more difficult task and is described separately.

First, the floater is formatted in the available width. If the width is not sufficient, the floater will return the width that exceeds the given (some lines may be forced) and this will be the minimum width possible for this floater. If the floater fits in the available width, then there are two possibilities: the width can shrink even more (max width is less then available width), or the entire available width is taken. Next, determine if there is empty space in the object that can be shrunk. An algorithm referred as CollectDataForShrinking( ) can perform the empty space computation by returning a bit whether any horizontal break happened in any line, or if any object had to go reduce in geometry (because the initial space was not wide enough). Thus, lines report breaks and each object report a reduction in geometry.

If there is space to shrink, a separate algorithm, denoted as GetDurShrink( ), can be run which looks at the ShrinkData structure (contains relevant geometrical data about all objects in the floater) and determines how much width can be shrunk. The algorithm looks at left-aligned objects as well as right-aligned objects, finds the object boundaries and removes as much inbetween whitespace (unoccupied) as possible. Note that centered objects (not left- or right-aligned) introduce complexity in calculations. However, centered lines do not since the centered lines are justified by the line services module 208. The line services module 208 returns the actual ink width of the line.

Following is a more detailed description of the autofit algorithm for floater objects executed by the autofit component 112. As previously indicated, the autofit process is initiated by the client application 202. The services module 206 requests the properties (via a GetProperties callback) of the floater from the client application 202. In order to return the floater width from the GetProperties callback the client application 202 runs the autofit. Note that since autofit uses the width of the track, the GetProperties callback obtains the track width as input. The track width is also used for percentage calculations.

An fsAutofitSubpage API is a service that can be added which is called by the user (of the user apps 204) to find the autofitted width of the floater. The syntax follows.
fsAutofitSubpage(in: nmSegment, durAvailable; out: durAutofitWidth)
where nmSegment is the segment name for floater internal content.
fsAutofitSubpage includes the following algorithm.

```
fsCreateSubpageBottomless(in: nmSegment, durAvailable, out:
pSubpage, BboxSubpage);
    // Floater is PEL with subpage. This formats floater internals.
    The goal is to find out subpage width (returned as subpage
    BBox).
If (BBoxSubpage.dur > durAvailable)   {
    return BBoxSubpage.dur;
} else {
    fsSubpageCollectDataForShrinking(in:pSubpage,out:ShrinkData,
fHorizontal Break);
    If (fHorizontalBreak)   {
        Return durAvailable;
    } else {
        GetDurShrink(in: ShrinkData; out:durMax);
        Return durMax;
    }
}
```

A CollectDataForShrinking family of functions is used recursively in order to collect data from all content of the floater. These functions can be called on subpage, subtrack, and all objects. One example of the CollectDataForShrinking algorithm follows.

```
CollectDataForShrinking(in: pfsPara, fswdir, durMBPLeft, durMBPRight,
                ShrinkAlignOverride,
                inout: ShrinkData,
                out: fHorizontalBreak);
SubtrackCollectDataForShrinking (in: pfsContext , pSubtrack, fswdir,
durMBPLeft, durMBPRight,
                ShrinkAlignOverride,
                inout: ShrinkData,
                out: fHorizontalBreak);
SubpageCollectDataForshrinking (in: pfsContext, pSubpage,
                inout: ShrinkData,
                out: fHorizontalBreak);
``` where durMBPLeft/durMBPRight is the total of left/right margin, padding and border for all parent tracks, ShrinkAlignOverride is a request to register all children as left/right aligned overriding the child properties, and fswdir is the direction of the current track.

These functions collect the boundaries for shrinking. Each entity adds to ShrinkData whether the entity is left or right aligned (for objects in fixed-width subtracks this property is reported as it was set on the parent subtrack, and a fixed-width subpage registers as one rectangle), a right boundary for left-aligned objects or a left boundary for right-aligned objects, and for objects in subtracks an additional number equal to the sum of margin plus border plus padding of all subtracks to which the object belongs.

In addition, each object reports whether a horizontal break occurred in the object. The definition of a horizontal break is left to the object, meaning if the object preferred a wider width, but was given less, the object acted differently. For example, text producing a non-hard line break or a floater moving one line down from the anchor will set the bit fHorizontalBreak to true.

A figure is treated as prepositioned for the shrinking algorithm. Thus, once the figure has been positioned in the available width the figure stays where in place during the shrinking process. To accomplish this, the figure registers both the left edge and the right edge using kseLeftFixed/kseRightFixed flags. This collection API is supported on all objects as follows.

A subpage object (pel) knows whether it is left or right aligned (takes ShrinkAlignOverride into account), registers its corresponding edge, and sets durflap to either durMBPLeft or durMBPRight, accordingly. If the object uses the full width of parent track, fHorizontalBreak is set to true (there is nothing to shrink). The pel does not need to collect anything from its children. A flap is defined as excess space (or margin) between the maximum object width and the width of the text in the object.

A subtrack (trel) passes this call to each of its children, adding its padding, border, and margin to durMBPLeft and durMBPRight. If the trel is of a fixed width, the trel sets ShrinkAlignOverride for its children to Left or Right according to its own alignment. The trel also aggregates fHorizontalBreak from all children. The fixed-width subtrack also ensures the fixed width is not shrunk. To accomplish this, a left (right) aligned subtrack registers a left (right) aligned child of zero width and zero height with the right (left) flap equal to the fixed subtrack width plus durMBPRight (durMBPLeft).

Text registers each line and each attached object according to its alignment and ShrinkAlignOverride, sets durflap to either durMBPLeft or durMBPRight accordingly, and sets output fHorizontalBreak.

If an object gets an input ShrinkAlignOverride set to a value other than None, this value is used to register everything in this object instead of the actual alignment value. This ensures that children of a fixed-width subtrack work as a fixed group.

A RegisterShrinkData API is used by objects to register object information in ShrinkData.

RegisterShrinkData(inout: ShrinkData, in: kShrinkEdge, ptTop, ptBottom, durFlap)

where kShrinkEdge indicates whether the right edge (for left-aligned objects) or the left edge (for right-aligned objects) will be registered, ptTop and ptBottom are coordinates of the edge, and durflap is the minimum distance from the object to the edge of the page content area (this is trivially calculated from durMBPLeft and durMBPRight).

```
enum ShrinkEdge {
    kseLeftEdge,
    kseRightEdge,
    kseLeftFixed,
    kseRightFixed
}
Enum ShrinkAlignOverride {
    ksaoNone,
    ksaoLeftAlign,
    ksaoRightAlign
}
```

A GetDurShrink function implements a geometrical algorithm that computes the minimum width in which formatting will produce a result without new horizontal breaks. The function looks at the results of the current formatting and finds the distance by which these results can be shrunk.

GetDurShrink(in: ShrinkData; out:durMax);

The basic outline of the GetDurShrink algorithm is as follows. The GetDurShrink algorithm gets on input an array of right edges of left-aligned objects and left edges of right-aligned objects (lines, floaters, etc.). The function then looks at every height and for this height, finds the distance between the rightmost left edge at this height, and the leftmost right edge at this height: durSlack. This value is how much unoccupied space can potentially be squeezed out of this line. The function also finds the distance between right edge plus durFlap for each left aligned object at this height and the right edge of the Floater's box. The same applies (symmetrically) for all right-aligned objects. The minimum of these numbers is the durFlapSlack value. The min of durSlack and durFlapSlack for each height is the result of the algorithm. This is how much horizontal space can be saved.

The flaps are processed because the borders/paddings/margins of subtracks are allowed to overlap with other objects in the main track, but fits inside the padding (content box) of the main track.

The GetDurShrink algorithm can also take into account prepositioned figures. A figure attached to a left-aligned object or left edge registers itself as a left-aligned object (registers the right edge). Similarly, a figure attached to a right-aligned object or right edge registers itself as a right-aligned object (registers the left edge). A figure that is centered registers both the left and right edges (kseLeftFixed/kseRightFixed). An algorithm calculates the sizes to two intervals on this specific height and chooses twice the smallest size.

Autofitting a table is also a complex task. This work involved for autofitting the able can be shared between the services module 206 and the client application 202. When the services module 206 requests table properties with the pfnGetTableProperties callback, the client application 202 autofits the table and returns three new properties: durTableWidth, which was formerly returned by pfnAutofitTable callback; and, durTableMinWidth and durTableMaxWidth, the minimum and maximum widths of a table calculated during the autofit pass.

Note that while in most cases durTableWidth will be a value in the range between durTableMinWidth and durTableMaxWidth, this is not necessarily true for all cases. For example, if the table in CSS says that it needs to be 100% of its parent, durTableWidth may become bigger that durTableMaxWidth. In order to achieve this behavior a new parameter durTrackWidth is added to the pfnGetTableProperties callback. The client application 202 uses track width to be able to autofit in this width.

```
FSERR (FSAPI *pfnGetTableProperties) (
    PFSCLIENT pfsclient,
    FSNMPARA nmTable,
    FSWDIR fswdirTrack,
    LONG durTrackWidth,
    FSTABLEOBJPROPS* pfstableobjprops);
```

An fsTableObjProps data structure contains durTableWidth, durTableMinWidth, and durTableMaxWidth members.

```
struct fstableobjprops
{
    LONG durTableWidth;
    LONG durTableMinWidth;
    LONG durTableMaxWidth;
    FSWDIR fswdirTable;
};
```

Similar changes can be made to the pel callbacks that return table properties (GetSizeClient, etc.).

The client application 202 performs autofit by using module services. For each cell in the table which is a subpage, the client application 202 formats a subpage in infinite width (using a service of the services module 206) thereby obtaining the subpage minWidth and maxWidth, combines these to calculate the width of each column, and finally, the width of the table. The client application 202 is responsible for this algorithm. The services module 206 assists by calculating min and max width of each subpage.

The fsGetMinMaxWidth API is added, which is a service that is called by the user (of the user apps 204) to find the autofitted width of a table cell.

FSGetMinMaxWidth(in: nmSegment; out: durMinWidth, durMaxWidth)

where nmSegment is the segment name for content (subpage) to be measured.

Although the internal of the cell may be a pel, autofitting is still performed on the subpage rather than pel, and the client application 202 performs the same work the pel does for autofit by deducting margin, border, and padding. fsGetMinMaxWidth can have the following algorithm:

```
FsCreateSubpageBottomless(in: nmSegment, durInfinite,
fDetermineMinWidth == fTrue,
              out: pSubpage, BboxSubpage,
              durMinWidth);
If (BBoxSubpage.dur < durInfinite) {
    durMaxWidth = BBoxSubpage.dur;
} else {
    FsSubpageCollectDataForShrinking(in:pSubpage,
out:ShrinkData,fHorizontal Break);
    Assert (fHorizontalBreak==fFalse)  ;  // We formatted in infinite width.
    GetDurShrink(in: ShrinkData; out:durMaxWidth);
}
```

All formatting methods (for objects, subpage, subtrack) get an extra Boolean parameter on input for calculating the min width and return the min width in durMinWidth output parameter. For text, this is accomplished using an API to the line services 208 to collect the MinWidths for each line, collect durMinWidth results from all objects attached to text, and choose the maximum of all of these results. For the subpage and subtrack, if of a fixed width, the width is returned; otherwise, all internals are formatted with fMinRequired and the maximum of the durMinWidth results is returned. Margins, border, padding are then added. For tables, autofitting is performed and minWidth is returned. This way, MinWidth is found during formatting, and MaxWidth is found using the same mechanism as in the floater. A subpage cache can be used during iterations to return min/max for subpages expediently without unnecessary formatting.

Note that during fsSubpageCollectDataForShrinking, a block registers a rectangle of its MaxWidth and not the FinalWidth. In the case where FinalWidth is greater than MaxWidth, for example when width is set to be 100% of the parent and the object had to be stretched (same as with justification for lines). In this pass we do not want to see stretched widths. A pfnFormatCellFinite function gets an extra parameter pfsPelSizeClient SizeClient on input that allows the client's cell-formatting code to directly get the precalculated size of the cell from this handle.

Two alternative solutions for table autofit are now described. In the first alternative, the client application 202 has more responsibilities. In the second alternative the services module's 206 own autofit solution asks for less help from the client application 202, less calls go through the client application 202, and the services module 206 takes care of the margins, borders, and padding peculiarities for autofitting.

The first alternative solution is represented as follows.

```
FSPelFormat (in: nmPel)
    pfnGetPelSizeClient(in:nmPel);
    pfnGetPelSizes(out:sizes for content and MBP);
        if (content == image)  {return SizeOfImage( );//trivial;}
        if (content == subpage)  {return
FSAutofitSubpage(nmSegment);}
        if (content == table)  {
            clientAutoFitTable(nmPel);
            clientGetMinMaxTable(nmPel);
            for each cell do {
                clientGetMinMaxCell(nmCell)
                    if (image) {trivial;}
                    if (subpage)
{FSGetMinMaxSubpage(nmSegm)}
                    if (table)
{GetMinMaxTable(nmNestedTable)}
            }
}
PTLS code:
FSGetMinMaxSubpage( )
    FSFormatSubpage(fDetermineMinWidth, durInfinite,
out:pSubpage, durMinWidth)
        FSFormattrack(...)
            FSFormatPara(...)
            ...
    FsSubpageCollectDataForShrinking (in:pSubpage)
    FSGetDurShrink( )
```

The second alternative solution is represented as follows.

```
FSFormatPel( )
    pfnGetPelSizeClient( );
    pfnGetPelSizes(out:sizes for content and MBP, where width can be "auto")
    If autofit is requested:
        If (subpage) {FSAutoFitSubpage(durAvailable-MBP,
out:SubpageWidth)}
        If (table)  {
            pfnAutofitTable(durAvailable-MBP,
out:TableWidth,MinWidth,MaxWidth)
                for each cell call:
                    FSGetMinMaxPel
        }
    pfnGetPelSizesAfterAutofit(out:sizes for content and MBP)
        //Resolve Margins that were auto.
Code for cell:
FSGetMinMaxPel(nmPara)   //nmCell
    FSFormatPel(fDetermineMinWidth, durInfinite, out:pfsPara,
durMinWidth);
    FsPelCollectDataForShrinking (in:pfsPara)
    FSGetDurShrink( )
```

The second alternative solution has the following features. The second solution puts the services module 206 in optional control of the autofit process. While the client application 202 is still responsible for implementing CSS specification peculiarities, the services module 206 can, optionally, intervene in the process and fix some scenarios, when requested. A second feature is that the pel is doing what it is designed to do. The client application 202 is not asked to determine which autofit process to start for which object (floater vs. table, etc.). A third feature is that fsAutofitSubpage becomes an internal API (there is no need to go through client application 202 to autofit a subpage (floater)). As fourth feature, this second solution provides a natural way for the pel to get the width numbers for MinWidth, MaxWidth and UsedWidth for the table autofit process. A fifth feature is there is one less PTS(page/table service)-Client-PTS transition in the stack. Instead of calling the PTS autofit services 210 from pftGetPelSizes callback, the client application 202 returns to the PTS 210, and the PTS 210 initiates and controls the autofit process.

With respect to interface changes to accommodate this second alternative solution, when pfnGetPelSizes( ) returns the structure with all sizes, it can return a value dvHeightIgnore for the height to indicate that the height is automatic. A similar value is allowed for width durWidth==duWidthAutofit to indicate that automatic width is requested. Additionally, when the client application 202 requests the width to be autofit, the client application 202 sets all the other values being returned (e.g., margin border, padding, etc.) to the values used for autofit calculations, not the final values. These values are dictated by the CSS specification (usually non-fixed margins are set to zero for autofit).

Further changes include adding a callback that is similar to pfnGetPelSizes( ), but has an extra parameter: the width of content calculated during autofit process.

pfnGetPelSizesAfterAutofit(in:durAutofittedWidth)

In response to this callback, the client application 202 returns the actual sizes for the MBP (margin, border, padding), etc., that might have been calculated based on the autofitted width of the content. Optionally, if the client application 202 desires more than one autofit iteration to establish proper MBP, the client application 202 can again return duWidthAutofit for the width and new values for MBP. The page/table services 210 will redo autofit with the new values (as many times as requested).

Formatting of APEs include similar changes to GetApeSizes( ) callback where the first call to GetApeSizes may return duWidthAutofit for the width of the APE and values for MBP (and left/right offset of APE). When called the second time with autofitted content width GetApeSizesAfterAutofit recalculates MBP+offsets and returns the final values.

Following is an algorithm for calling Pel and/or Trel methods for formatting. Of interest is what happens when formatting in infinite width in fMinMaxRequired pass.

Pel calls GetSizes( ) (CreateSizeClient), and the client application 202 performs the following. If the size is fixed, Min=Max=Width=Fixed is returned. If the size is auto, the client application 202 calls the GetMinMax subpage, gets Min and Max (Min/=Max) and returns Width=Max and, Max and Min as calculated in GetMinMax. If the size is X % of the parent and parent size is undefined (autofit pass), the client application 202 calls GetMinMax, gets Min and Max, and then returns RetWidth=Max, RetMax=Max/X, and RetMin=Min/X.

If size is 100%, the client application 202 may return RetWidth TrackWidth (usually infinite). This ensures that no text fits next to a pel (floater) which is 100% of parent. This is accomplished through heuristics. The client application 202 may choose to do this also for 99%, etc. If not done, the result can be that the autofit width will be larger than desired. If this is overdone, the result can be that some line next to a floater will break. Since the CSS specification does not allow percentages inside autofit, this is a good heuristics solution.

Now that Pel has received the Min, Max and Width, Pel does the following:

FormatPara(Width, fMinRequired=false).

This formatting registers geometry information, as before. In the Shrink pass, registration is for one rectangle of size Width. The rectangle can also have additional Flap=Max−Width. As durMin, return Min that was obtained from the client application 202 in GetSizes( ). Pel add its own margins to the returned numbers. Regular flaps are also added during the Shrink registration.

Trel calls GetSizes( ), and the client application 202 reacts in the following way. If the size is fixed, the client application 202 returns Min=Max=Width=Fixed. If the size is autofit (auto), the client application 202 returns RetWidth=InputWidth (track width, usually Infinite), RetMax=InputWidth, RetMin=0, and fAutofittedTrel=fTrue.

If the size is X % of the parent and parent size is undefined (autofit pass), the client application 202 calls GetMinMaxSubpage to format internals as Subpage, and returns RetWidth=Max, RetMax=Max/X, and RetMin=Min/X.

Trel has now received Min, Max and Width (Min and Max are valid only if !fAutofittedTrel) and performs the following:

If (fAutofittedTrel) {
    FormatPara(Width, fMinRequired = true);

This formatting registers geometry information, as before. The Min returned from this formatting is the final Min to be returned by Trel. Shrink registers all internals aligned as is (no override).

} else {
    FormatPara(Width, fMinRequired = false);

This formatting registers geometry information, as before. The Min returned from GetSizes( ) is used as the final Min to return from Trel. The Max returned from GetSizes( ) is used to register in Shrink for all subrectangles as Flap: (Flap=Max−SubrectangleActualWidth). Shrink registers all internals aligned as the Trel is aligned (override with trel's alignment).
}

In all these cases, if the margin is auto, margin is reported as zero. If the margin is a percentage of the parent and the parent size is undefined margin is reported as zero. Once the size of content is computed the margins are recalculated according to the size of content. If the parent's size is not available, the content size is used instead and the margins are calculated as a percentage of the content (divide by % instead of multiplying, etc.). This produces the parent's width. Again, first report zero, calculate size of the content, and then recalculate the margins based on content size.

The client application 202 suppresses hard breaks inside the autofit pass. The client application 202 knows the autofit pass has stated because the client application 202 initiated the autofit. The autofit is done in a bottomless page, however, the services module 206 does not know the page is bottomless.

A flap for an object A is defined as the total of MBP—the sum of the margin+border+padding for all subtracks this object is inside of. For the inner object itself, the MBP is added either to the flap—for objects that do want other floaters to be able to intervene in their MBP, such as Trel, or to the registered Shrink rectangle—for objects that do not want other floaters to be able to intervene in their MBP, such as Pel.

Flap is the minimum distance to be maintained between the object's box and the edge of the main track. Flap is used both for MBPs and for ensuring an object takes at least X % of the parent.

The GetMinMaxSubpage formats in infinite width with fMinMaxRequired, producing the final MinWidth. GetMinMaxSubpage then collects Shrink data, and run the Shrink algorithm to produce MaxWidth.

Figure 3:
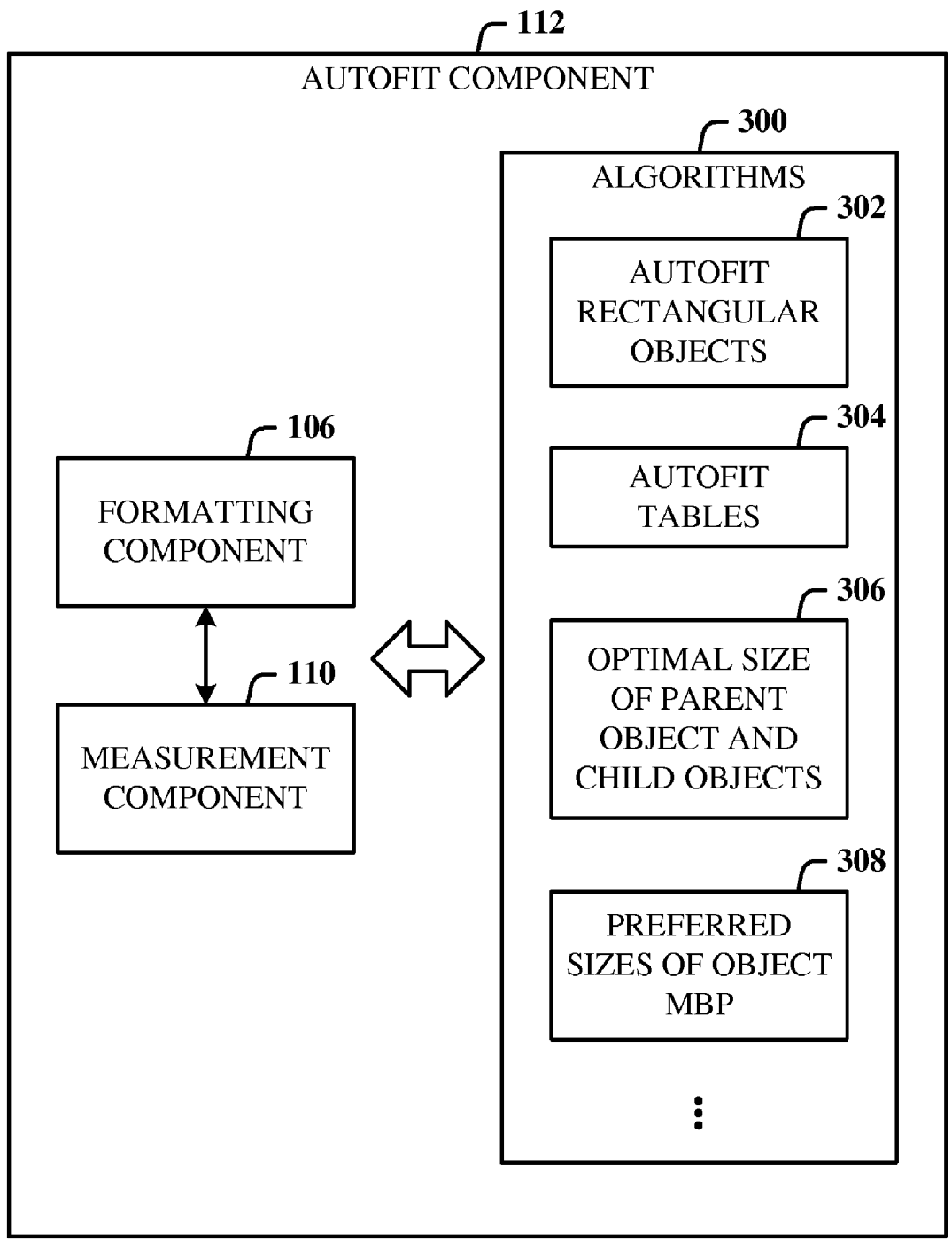
FIG. 3 illustrates algorithms that can be employed to facilitate the computation of optimal object sizes in documents.

FIG. 3 illustrates algorithms that can be employed to facilitate the computation of optimal object sizes in documents. The autofit component 112 of FIG. 1 is shown to include the formatting component 106 and measurement component 110 of FIG. 1, and also algorithms 300 employed by formatting and measurement to obtain the optimal object widths and other object information. For example, the algorithms 300 include an autofit algorithm 302 for autofitting rectangular objects (e.g., floaters), when the document includes both left-aligned and right-aligned objects.

An autofit algorithm 304 is provided for autofitting tables. An algorithm 306 computes the optimal size of a parent object and one or more child objects such as when the width of the parent object is unknown (auto), and the width of the child object is expressed as a percentage of the width of the parent object, for example. The algorithm 306 can recursively calculate the optimal widths of objects inside objects whose width is undefined. Moreover, the level of nesting is unlimited. A two-pass algorithm 308 calculates the optimal sizes of margins, borders and paddings of objects, where any combination of the objects can have fixed widths, auto widths and/or percentage-based widths. The first pass is a preliminary layout pass and the second pass is the main autofit pass.

Figure 4:
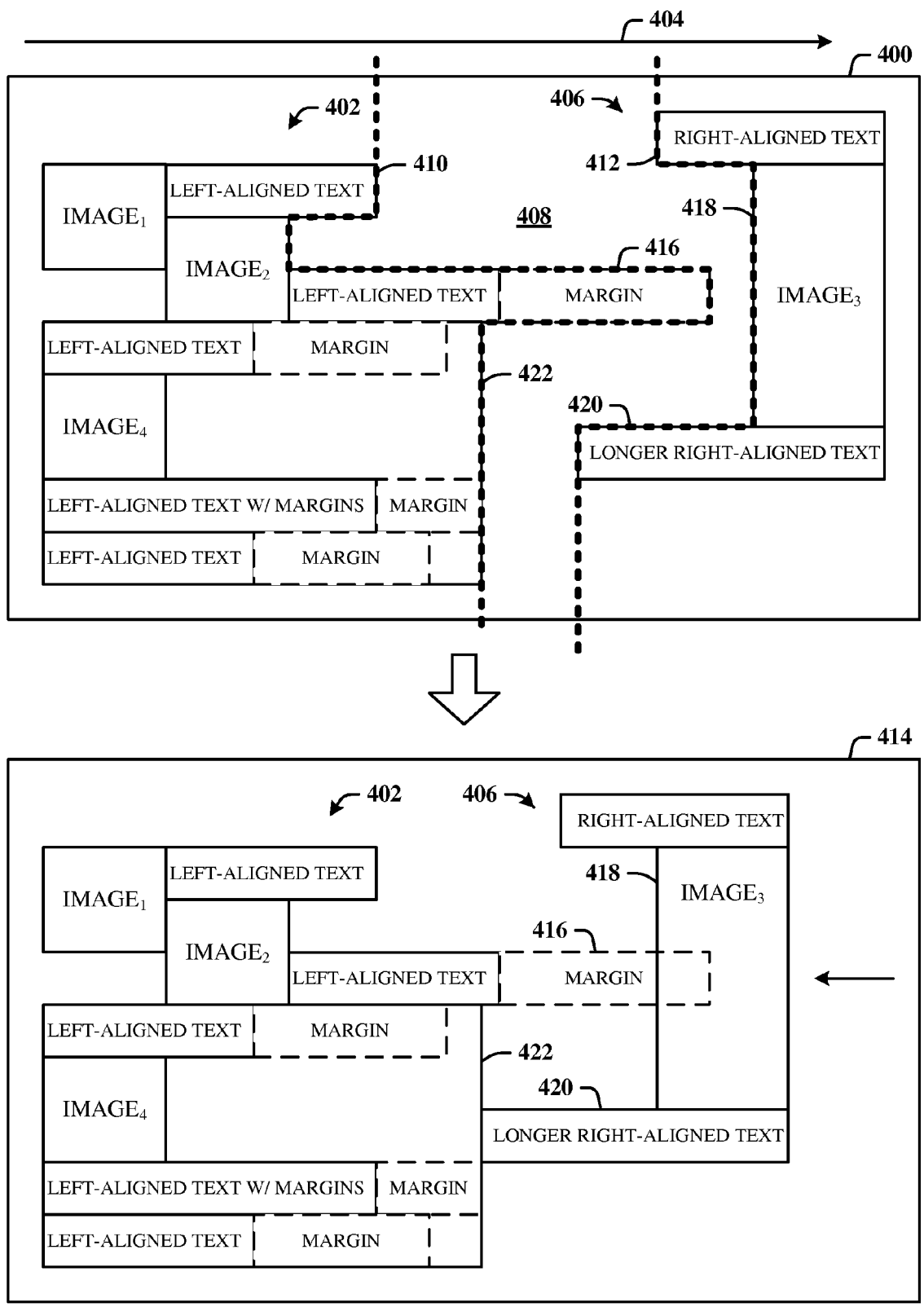
FIG. 4 illustrates an autofitting process for a document of left-aligned objects and right-aligned objects.

FIG. 4 illustrates an autofitting process for a document of left-aligned objects and right-aligned objects. The process begins, in panel 400, by formatting the left-aligned objects 402 along the left according to an infinite width 404. Similarly, formatting also processes the right-aligned objects 406 according to the infinite width 404. Thus, there is an unoccupied space 408 between the left-aligned objects 402 and the right-aligned objects 406.

The right edges of the left-aligned objects 402 are then registered on the client, and left edges of the right-aligned objects 406 are also registered. The right edges of the left-aligned objects 402 define a left-aligned line 410 and the left edges of the right-aligned objects 406 define a right-aligned line 412. The lines (410 and 412) bound the unoccupied space 408. The client computes the minimum distance between the lines (410 and 412).

In panel 414, the right-aligned objects 406 are repositioned toward the left-aligned objects 402 based on reduction of the unoccupied space 408. Panel 400 indicates, visually, that the smallest distance between the lines (410 and 412) could be at the margin 416 and a third image 418. Thus, the right-aligned objects 406 can be moved (or repositioned) in a leftward direction until the left edge of the third object 418 abuts the right edge of the margin 416. However, margins typically do not include content, but only whitespace. Thus, the right-aligned objects 406 can be moved further to the left (along the infinite width 404) thereby overlapping the margin 416, resulting in the object representation in panel 414, where the left edge of the longer right-aligned text 420 abuts the right edge of an object 422.

It is to be appreciated that the right-aligned objects 406 could be moved to the left even further by overlapping the margin 416 with the third image 418 until the right edge of the margin 416 aligns with the right edge of the third image 418. This would push the right-aligned text 420 into the space of object 422, which may be acceptable.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
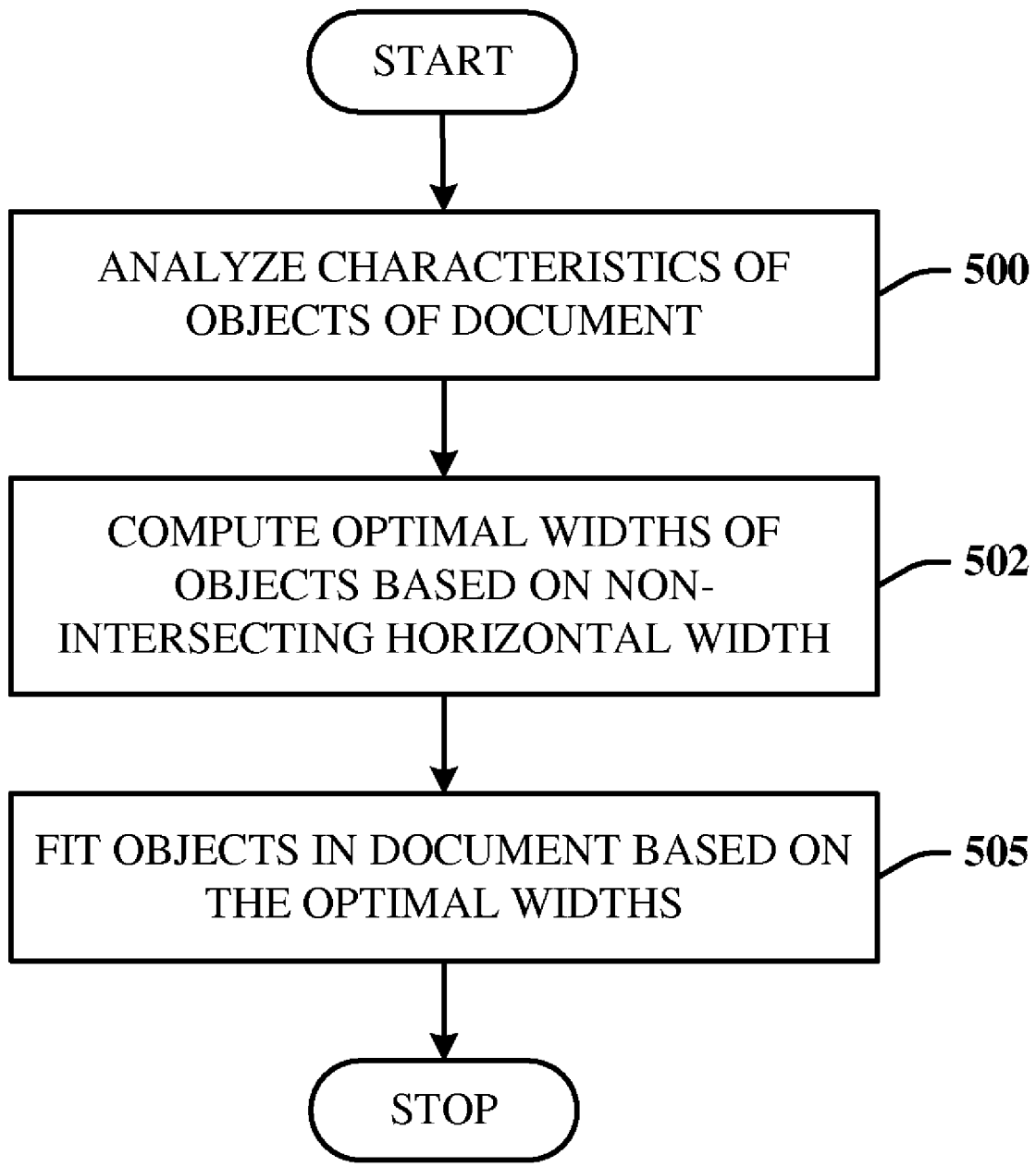
FIG. 5 illustrates a computer-implemented method of processing objects in a document.

FIG. 5 illustrates a computer-implemented method of processing objects in a document. At 500, characteristics of the objects of the document are analyzed. This can include identifying floaters, tables, pels, trels, etc. At 502, optimal widths of the objects are computed based on a non-intersecting horizontal width. At 504, the objects are autofitted in the document based on the optimal widths.

Figure 6:
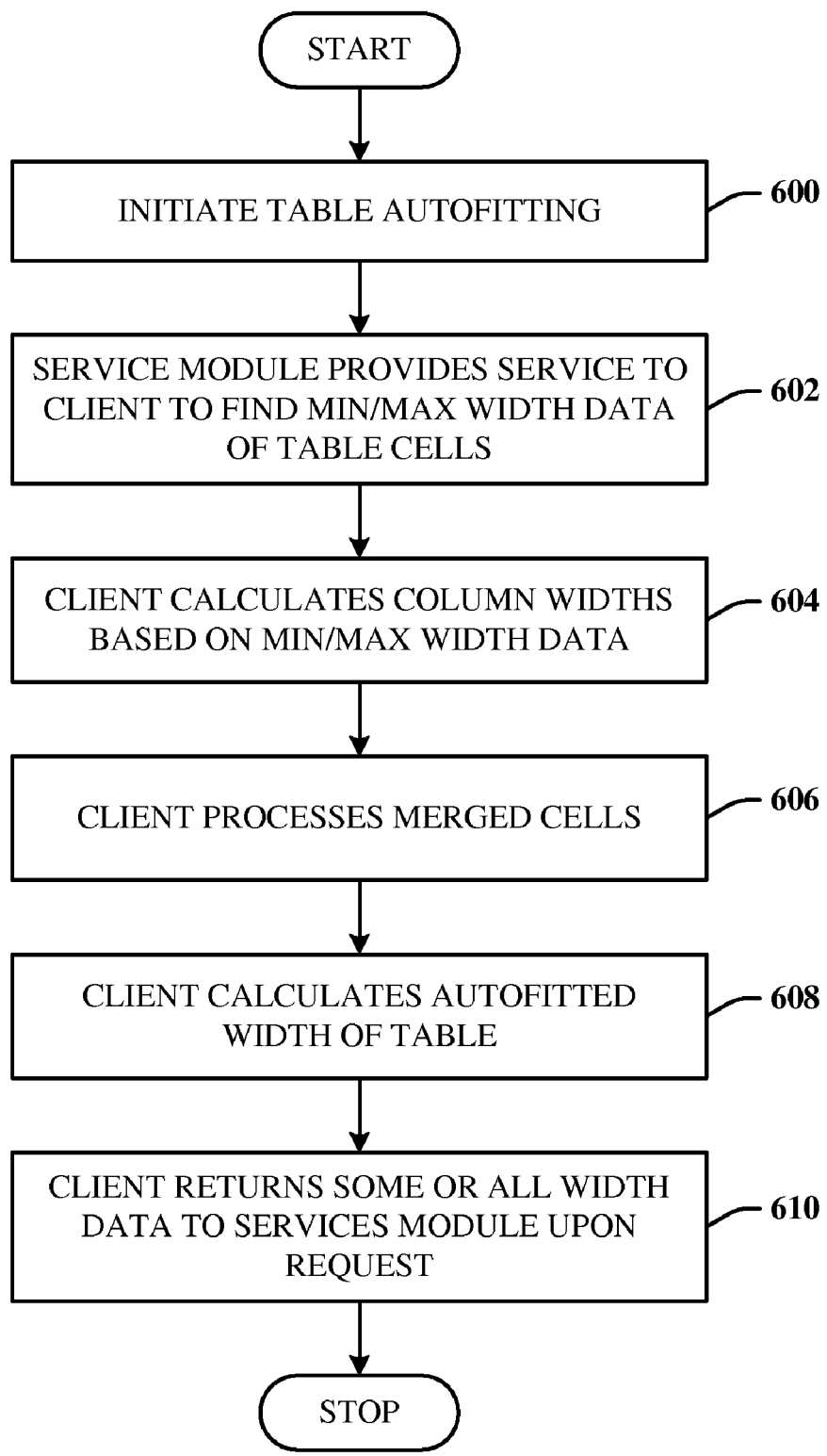
FIG. 6 illustrates a method of performing table autofitting.

FIG. 6 illustrates a method of performing table autofitting. At 600, table autofitting is initiated based on a table object in the document. This can be initiated by a client application that facilitates document object formatting, analysis and autofitting. At 602, a service module in communication with the client application provides a service to the client, the service assisting in finding the min/max data of the table cells. At 604, the client calculates column widths of the table based on the min/max data. At 606, the client also processes any merged cells in the table. At 608, the client calculates the autofitted width of the table. At 610, the client returns some or all width data to the services module upon request. The client stores data until the services module prompts the client to produce the requested data.

Figure 7:
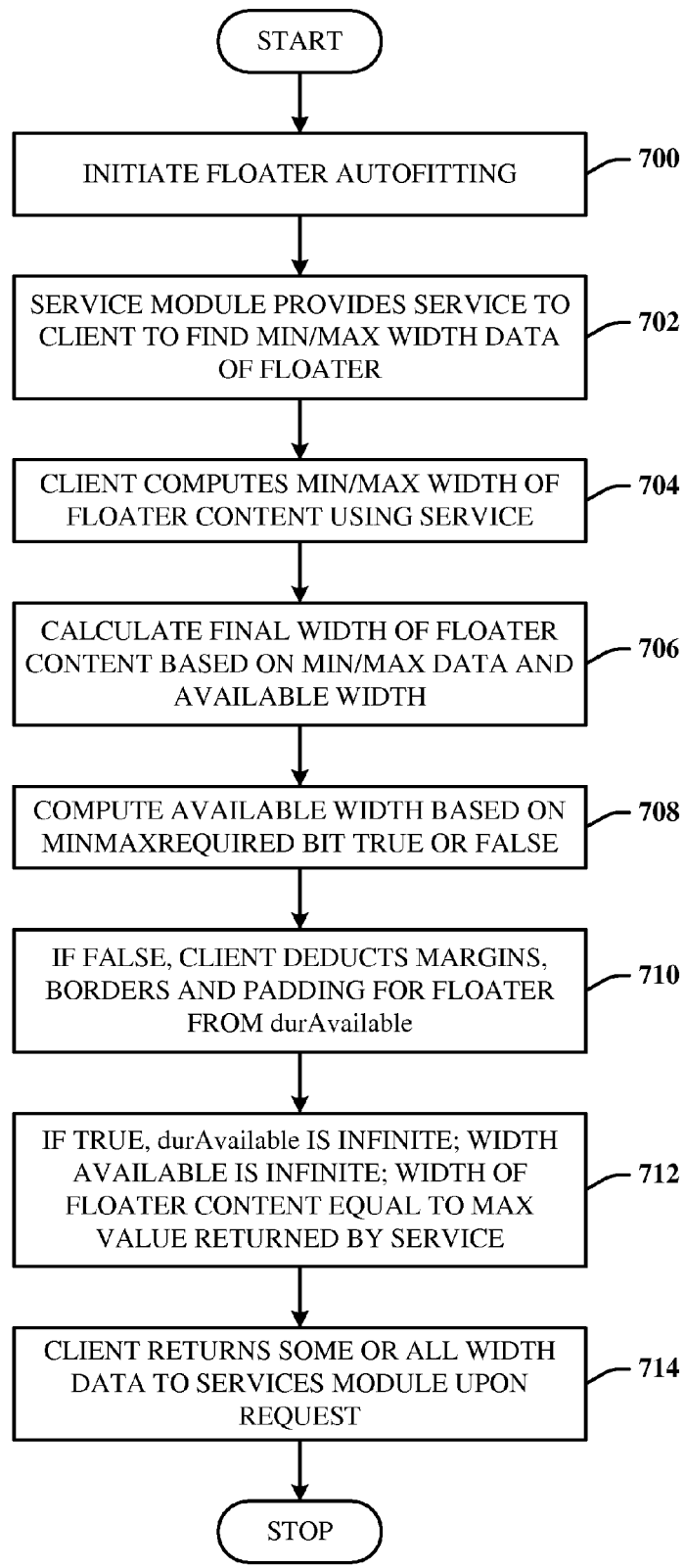
FIG. 7 illustrates a method of processing floater objects of a document.

FIG. 7 illustrates a method of processing floater objects of a document. At 700, the floater autofitting is initiated. At 702, the service module provides a service to the client to assist in finding the min/max width data of the floater. At 704, the client computes the min/max width of the floater content using the service. At 706, the final width of the floater is calculated based on the min/max data and the available width. At 708, computation of the available width is initiated based a MinMaxRequired bit being true or false. At 710, if false, the client deducts margins, borders, and padding for the floater from durAvailable. At 712, if true, durAvailable is set to infinite and the width available is set to infinite. The width of the floater content is equal to the max value returned by the service. At 714, the client returns some or all width data to the services module upon request.

Figure 8:
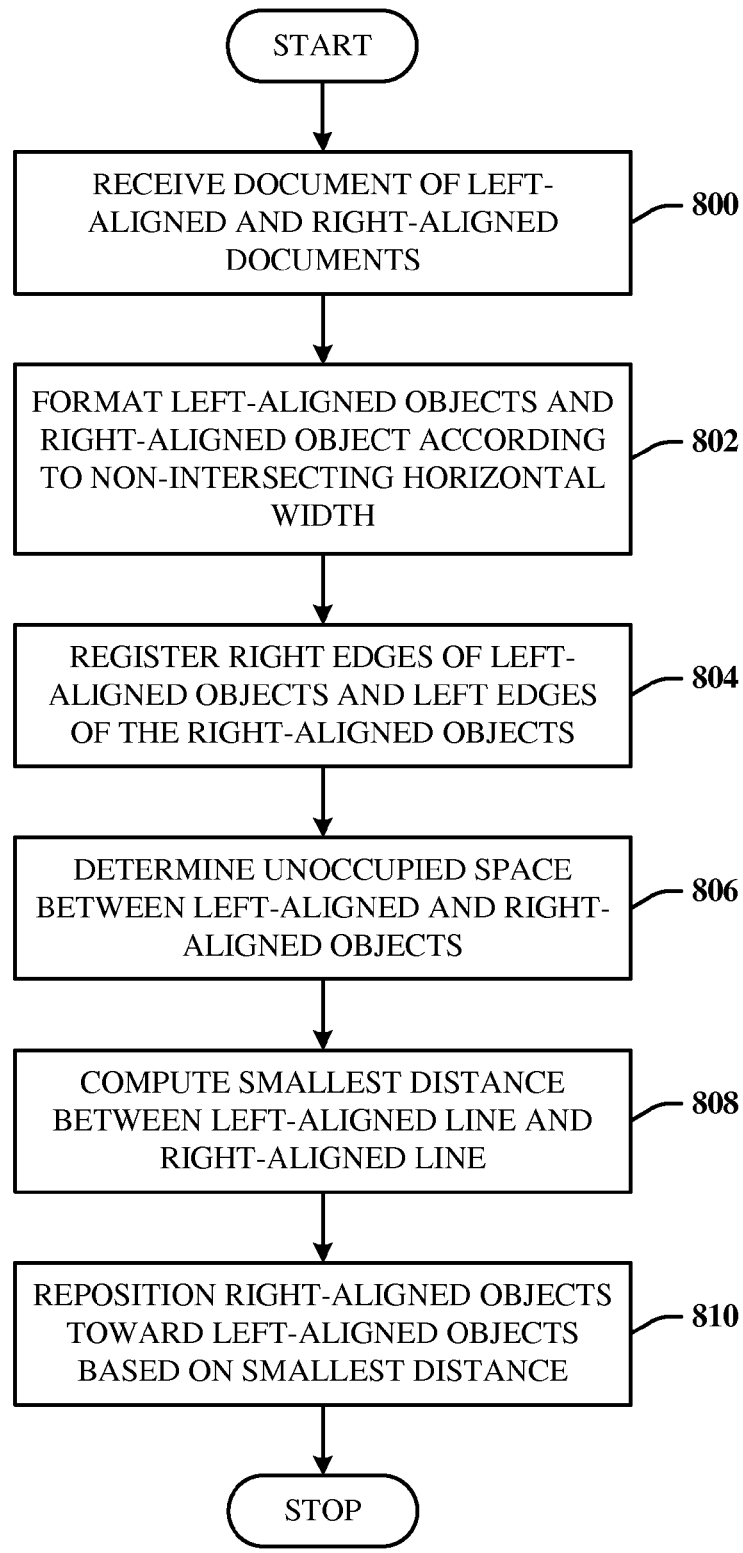
FIG. 8 illustrates a method for computing unoccupied space between left- and right-aligned object of a document.

FIG. 8 illustrates a method for computing unoccupied space between left- and right-aligned object of a document. At 800, a document having left-aligned objects and right-aligned objects is received. At 802, the left-aligned objects and the right-aligned objects are formatted according to a non-intersecting horizontal width. This includes the formatting of objects inside of other objects. Objects are formatted in the order of appearance in the backing store file. This is for correct vertical positioning of the objects. The horizontal positioning is performed according to the non-intersecting horizontal width, and then shrunk to the correct horizontal positions. At 804, registration of the right edges of the left-aligned objects and registration of the left edges of the right-aligned objects is performed. The right edges of the left-aligned objects define a left-aligned line, and the left edges of the right-aligned objects define a right-aligned line. At 806, the space between the left-aligned objects and the right-aligned objects is computed as unoccupied space. At 808, the smallest distance between the left-aligned line and the right-aligned line in the unoccupied space is computed. At 810, the right-aligned objects are repositioned toward the left-aligned objects based on the smallest distance.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
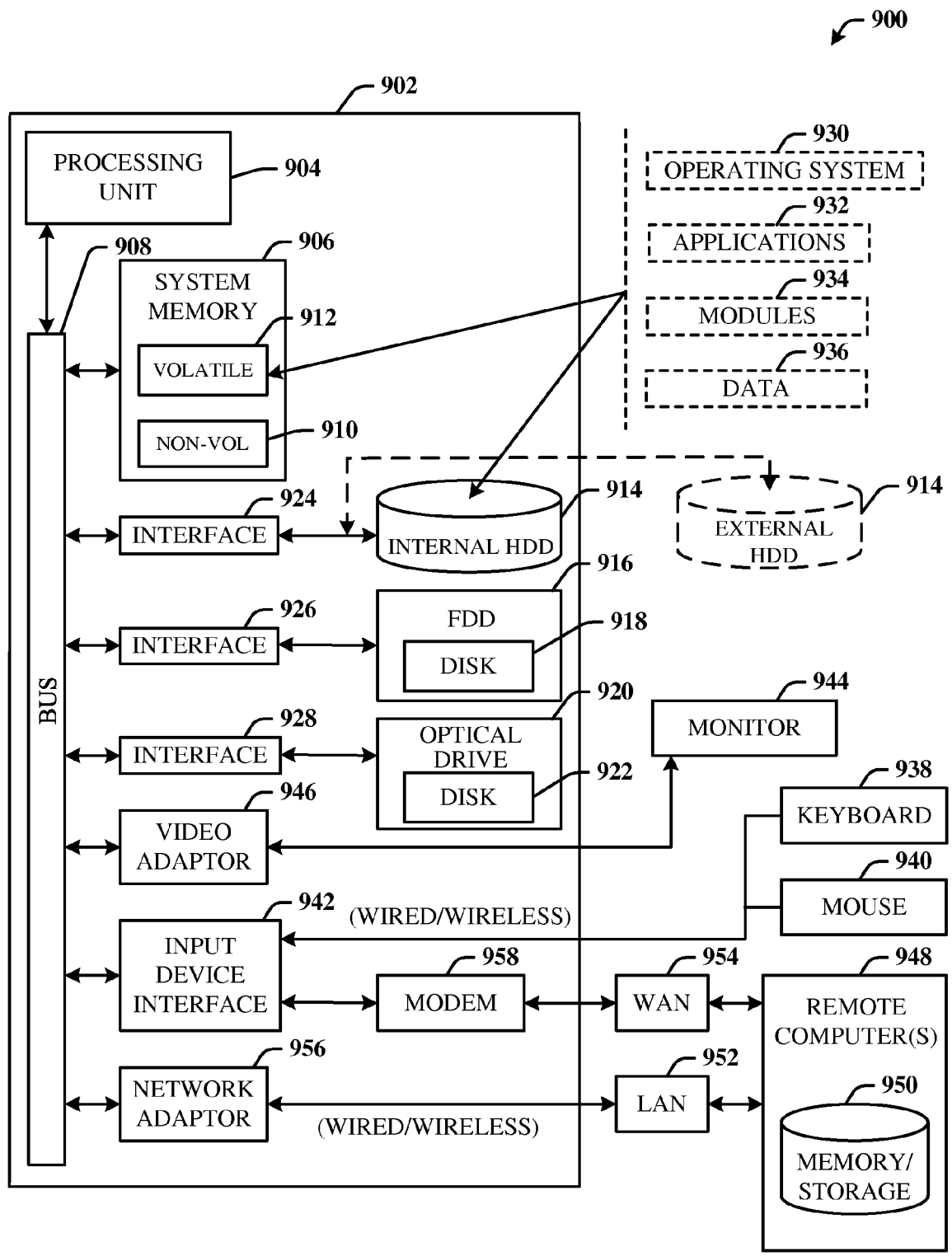
FIG. 9 illustrates a block diagram of a computing system operable to execute formatting and autofitting for optimal object widths in accordance with the disclosed architecture.

Referring now to FIG. 9, there is illustrated a block diagram of a computing system 900 operable to execute formatting and autofitting for optimal object widths in accordance with the disclosed architecture. In order to provide additional context for various aspects thereof, FIG. 9 and the following discussion are intended to provide a brief, general description of a suitable computing system 900 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902 having a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 can include non-volatile memory (NON-VOL) 910 and/or volatile memory 912 (e.g., random access memory (RAM)). A basic input/output system (BIOS) can be stored in the non-volatile memory 910 (e.g., ROM, EPROM, EEPROM, etc.), which BIOS are the basic routines that help to transfer information between elements within the computer 902, such as during start-up. The volatile memory 912 can also include a high-speed RAM such as static RAM for caching data.

The computer 902 further includes an internal hard disk drive (HDD) 914 (e.g., EIDE, SATA), which internal HDD 914 may also be configured for external use in a suitable chassis, a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 912, including an operating system 930, one or more application programs 932, other program modules 934, and program data 936. The one or more application programs 932, other program modules 934, and program data 936 can include the objects 102, document 104, formatting component 106, measurement component 110, client application 108, autofit component 112, client object processing application 202, user applications 204, services module 206, line services 208, page/table services 210, backing store 212, and algorithms 300, for example.

All or portions of the operating system, applications, modules, and/or data can also be cached in the volatile memory 912. It is to be appreciated that the disclosed architecture can be implemented with various commercially available operating systems or combinations of operating systems.

A user can enter commands and information into the computer 902 through one or more wire/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, etc.

A monitor 944 or other type of display device is also connected to the system bus 908 via an interface, such as a video adaptor 946. In addition to the monitor 944, a computer typically includes other peripheral output devices (not shown), such as speakers, printers, etc.

The computer 902 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, is connected to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for processing objects in a document, comprising:
    a formatting component for formatting objects including left-aligned objects and right-aligned objects of a document based on a non-intersecting horizontal width;
    a measurement component for computing unoccupied space between the left-aligned objects and the right-aligned objects and optimal sizes of the objects based on results of the formatting;
    an autofit component for repositioning the right-aligned objects toward the left-aligned objects based on the non-intersecting horizontal width and reduction of the unoccupied space; and
    a processor that executes computer-executable instructions associated with at least one of the formatting component, the measurement component, or the autofit component.

2. The system of claim 1, wherein the formatting component formats the objects based on the unoccupied space along the non-intersecting horizontal width.

3. The system of claim 1, wherein the objects include left-aligned rectangular or non-rectangular objects and right-aligned rectangular or non-rectangular objects.

4. The system of claim 3, wherein the rectangular objects include a floater that presents a complex geometry for computing an optimal size of an object.

5. The system of claim 1, wherein the measurement component computes an optimal size of a parent object and an optimal size of a child object of the parent object when a width of the parent object is unknown.

6. The system of claim 5, wherein the width of the child object is expressed as a percentage of the width of the parent object.

7. The system of claim 1, wherein the measurement component computes the optimal sizes of at least one of margins, borders, or paddings of the objects.

8. The system of claim 1, wherein the objects include at least one of fixed width objects, automatic width objects, or percentage-expressed width objects.

9. The system of claim 1, wherein the objects include a table for which the measurement component computes the optimal size.

10. The system of claim 1, wherein the measurement component recursively computes an optimal width of an inner object inside of an outer object, the width of the outer object being undefined.

11. A computer-implemented method of processing objects in a document, comprising acts of:
    analyzing characteristics of differently aligned objects of a document including heights and widths of the objects;
    computing unoccupied space between left-aligned objects and right-aligned objects in the document;
    computing optimal widths of the objects based on a non-intersecting horizontal width;
    repositioning the right-aligned objects toward the left-aligned objects in the document based on the optimal widths and reduction of the unoccupied space between the left-aligned objects and right-aligned objects; and utilizing a processor to execute instructions stored in memory to perform at least one of the acts of analyzing, computing, or repositioning.

12. The method of claim 11, further comprising fitting objects, the objects include both left-aligned objects and right-aligned objects.

13. The method of claim 12, wherein the objects include one or more floater objects.

14. The method of claim 11, wherein the objects include cells of a table, and the optimal widths of the cells are calculated to determine the width of the table.

15. The method of claim 11, further comprising computing the optimal widths of at least one of margins, borders, or padding of the objects.

16. The method of claim 11, wherein the objects have at least one of a fixed width, an auto width, or a percentage-based width.

17. The method of claim 11, further comprising fitting the objects based on nested levels of objects and object widths.

18. A computer-implemented method of processing objects in a document, comprising acts of:

receiving a document having left-aligned objects and right-aligned objects;

formatting the left-aligned objects and right-aligned objects according to a non-intersecting horizontal width;

computing unoccupied space between the left-aligned objects and the right-aligned objects;

repositioning the right-aligned objects toward the left-aligned objects based on reduction of the unoccupied space; and utilizing a processor to execute instructions stored in memory to perform at least one of the acts of receiving, formatting, computing, or repositioning.

19. The method of claim 18, further comprising registering right edges of the left-aligned objects and left edges of the right-aligned objects to define a left-aligned line of the right edges and a right-aligned line of the left edges.

20. The method of claim 19, further comprising computing a smallest distance between the left-aligned line and the right-aligned line as the unoccupied space, and repositioning the right-aligned objects toward the left-aligned objects based on the smallest distance.

* * * * *